(12) United States Patent
Brueggeman

(10) Patent No.: US 9,713,952 B1
(45) Date of Patent: Jul. 25, 2017

(54) VEHICLE SIDE PROTECTION DEVICE

(71) Applicant: Christopher Brueggeman, Godfrey, IL (US)

(72) Inventor: Christopher Brueggeman, Godfrey, IL (US)

( * ) Notice: Subject to any disclaimer, the term of this patent is extended or adjusted under 35 U.S.C. 154(b) by 0 days.

(21) Appl. No.: 15/205,251

(22) Filed: Jul. 8, 2016

(51) Int. Cl.
*B60J 11/02* (2006.01)

(52) U.S. Cl.
CPC .................. *B60J 11/025* (2013.01)

(58) Field of Classification Search
USPC .............................. 280/770; 293/128; 296/98
See application file for complete search history.

(56) References Cited

U.S. PATENT DOCUMENTS

| | | | | |
|---|---|---|---|---|
| 1,231,874 A * | 7/1917 | Gallamore | ............... | B60J 7/085 160/113 |
| 1,450,262 A * | 4/1923 | Schauman | ............. | B60R 19/26 200/DIG. 10 |
| 3,540,773 A * | 11/1970 | Settle | ..................... | B60J 11/025 280/770 |
| 3,704,037 A * | 11/1972 | Glassberg | ................ | B60J 11/06 108/46 |
| 3,718,357 A | 2/1973 | Hertzell | | |
| 4,461,503 A | 7/1984 | Melby | | |
| 4,530,519 A | 7/1985 | Marshall | | |
| 4,786,099 A * | 11/1988 | Mount | ..................... | B60J 7/068 296/100.05 |
| 4,795,206 A * | 1/1989 | Adams | ....................... | B60J 5/14 160/201 |
| 4,889,381 A * | 12/1989 | Tamblyn | .................. | B60J 7/068 160/133 |
| 4,997,227 A * | 3/1991 | Falzone | .................. | B60R 13/01 150/166 |
| 5,004,281 A | 4/1991 | Yamazaki | | |
| 5,050,925 A | 9/1991 | Brown | | |
| 5,129,678 A * | 7/1992 | Gurbacki | ................. | B60J 11/06 150/166 |
| 5,129,695 A | 7/1992 | Norman, II | | |
| D335,271 S | 5/1993 | Davis | | |
| 5,312,145 A | 5/1994 | McNeil | | |
| 5,518,283 A | 5/1996 | Egelske | | |
| 5,597,196 A * | 1/1997 | Gibbs | ....................... | B60J 11/02 160/326 |
| 5,788,307 A * | 8/1998 | Gilbert | ................... | B62D 33/02 280/770 |
| 5,868,425 A * | 2/1999 | McNulty | .................. | B60J 11/06 150/166 |

(Continued)

*Primary Examiner* — J. Allen Shriver, II
*Assistant Examiner* — Brian Cassidy

(57) ABSTRACT

A vehicle side protection device prevents damage to the side of a vehicle. The device includes a housing for coupling to a vehicle. A slot extends through a top side of the housing into an interior space of the housing. Each of a pair of rails is coupled to and extends from the housing coplanar with the roller wherein the rails are configured for being positioned on the side of the vehicle. A cover has a bottom end coupled to a roller in the housing such that rotation of the roller extends and retracts the cover relative to the housing. The cover comprises slats coupled to a layer of fabric positioned between the slats and the side of the vehicle. The slats are stiff and parallel to each other and the roller wherein the cover is pivotable along edges of the slats to facilitate wrapping the cover around the roller.

6 Claims, 3 Drawing Sheets

(56) References Cited

U.S. PATENT DOCUMENTS

| | | | | |
|---|---|---|---|---|
| 6,062,617 | A * | 5/2000 | Marks | B60J 11/06 |
| | | | | 293/128 |
| 6,073,964 | A * | 6/2000 | Smith | B60J 11/06 |
| | | | | 280/770 |
| 6,210,772 | B1 * | 4/2001 | Ackermann | B60J 11/06 |
| | | | | 150/166 |
| 6,296,279 | B1 * | 10/2001 | Stoddard | B60J 11/06 |
| | | | | 280/770 |
| 6,813,863 | B2 * | 11/2004 | Duffy | E04H 6/426 |
| | | | | 160/330 |
| 7,077,440 | B1 * | 7/2006 | Morales | B60R 19/42 |
| | | | | 293/127 |
| 7,393,028 | B2 | 7/2008 | Ohara | |
| 7,794,174 | B2 * | 9/2010 | McKenney | E01F 15/0453 |
| | | | | 404/6 |
| 9,333,894 | B1 * | 5/2016 | Hunting, Sr. | B60J 11/06 |
| 9,404,716 | B2 * | 8/2016 | Shoshan | F41H 5/00 |
| 2010/0102588 | A1 * | 4/2010 | Li | B60J 11/02 |
| | | | | 296/98 |
| 2013/0147173 | A1 * | 6/2013 | Wohlberg | B60J 11/06 |
| | | | | 280/770 |

* cited by examiner

VEHICLE SIDE PROTECTION DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention
(2) Description of Related Art Including Information Disclosed Under 37 CFR 1.97 and 1.98

The disclosure and prior art relates to protection devices and more particularly pertains to a new protection device for preventing damage to the side of a parked vehicle.

BRIEF SUMMARY OF THE INVENTION

An embodiment of the disclosure meets the needs presented above by generally comprising a housing for coupling to a vehicle. A slot extends through a top side of the housing into an interior space of the housing. Each of a pair of rails is coupled to and extends from the housing coplanar with the roller wherein the rails are configured for being positioned on the side of the vehicle. A cover has a bottom end coupled to a roller in the housing such that rotation of the roller extends and retracts the cover relative to the housing. The cover comprises slats coupled to a layer of fabric positioned between the slats and the side of the vehicle. The slats are stiff and parallel to each other and the roller wherein the cover is pivotable along edges of the slats to facilitate wrapping the cover around the roller.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
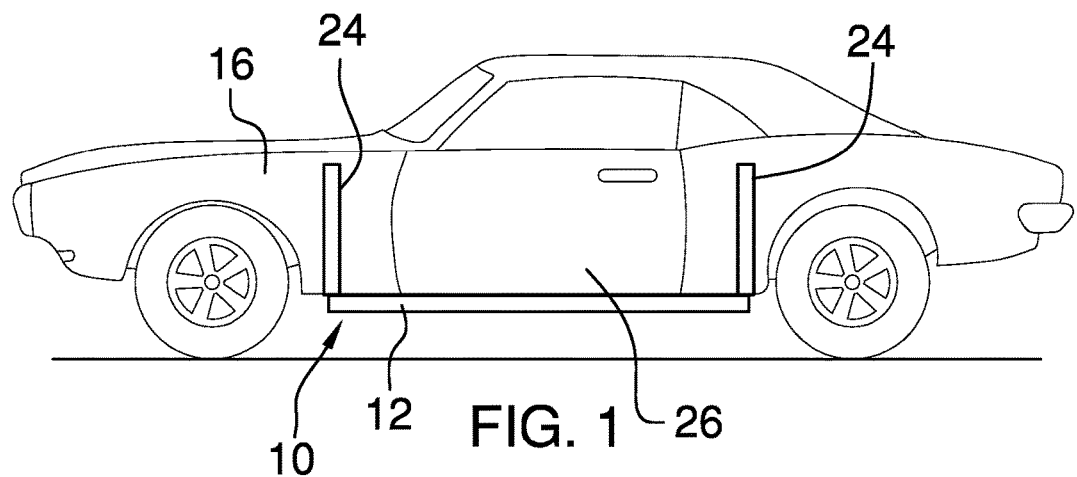
FIG. 1 is a front view of a vehicle side protection device according to an embodiment of the disclosure in a stored position.
Figure 2:
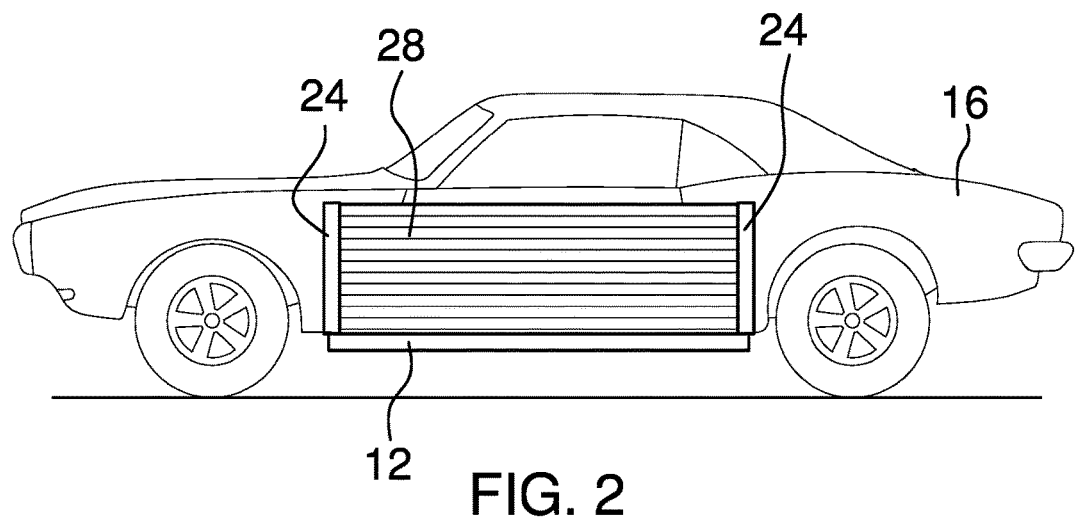
FIG. 2 is a front view of an embodiment of the disclosure in a deployed position.
Figure 3:
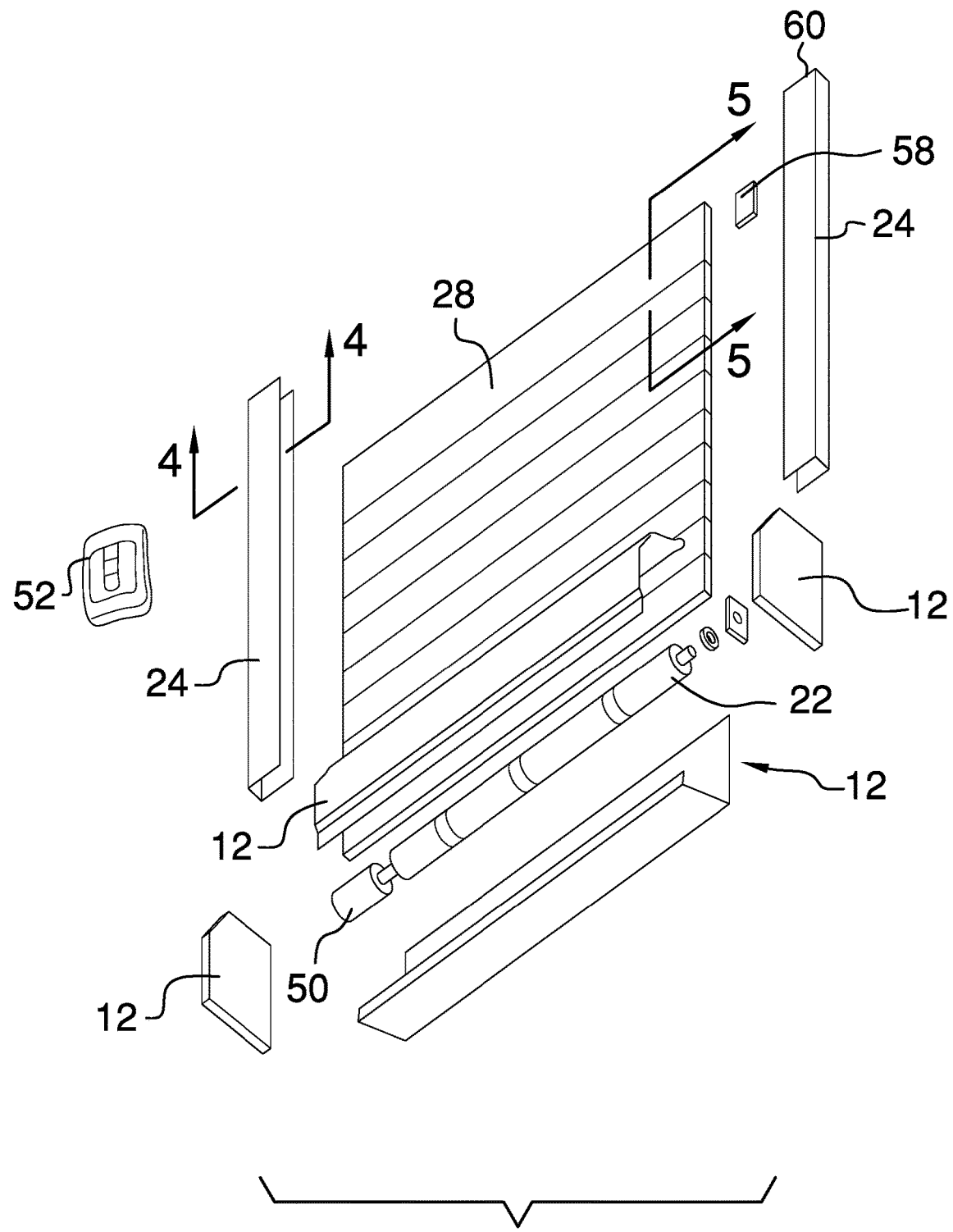
FIG. 3 is an exploded bottom front side perspective view of an embodiment of the disclosure.
Figure 4:
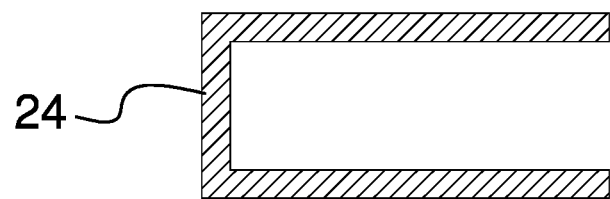
FIG. 4 is a cross-sectional view of an embodiment of the disclosure taken along line 4-4 of FIG. 3.
Figure 5:
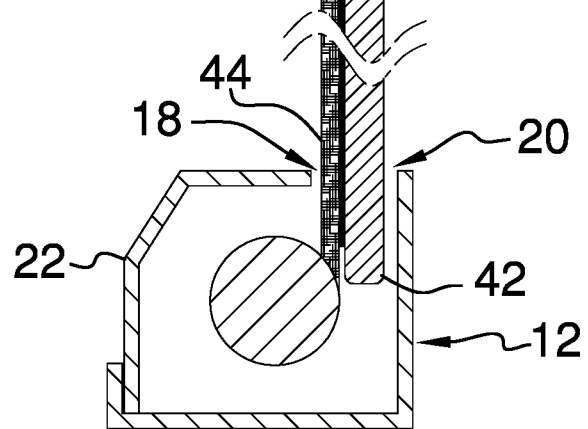
FIG. 5 is a cross-sectional view of an embodiment of the disclosure taken along line 5-5 of FIG. 3.

With reference now to the drawings, and in particular to FIGS. 1 through 5 thereof, a new protection device embodying the principles and concepts of an embodiment of the disclosure and generally designated by the reference numeral 10 will be described.

As best illustrated in FIGS. 1 through 5, the vehicle side protection device 10 generally comprises a housing 12 defining an interior space 14. The housing 12 is configured for coupling to a vehicle 16. The housing 12 may be positioned and attached similarly to a running board or the like using conventional tools, hardware, and methods which may include adding mounting holes or structure to the housing 12 as needed. A slot 18 extends through a top side 20 of the housing 12. The slot 18 is open into the interior space 14. A roller 22 is positioned in the housing 12 and mounted to allow rotation of the roller 22 within the housing 12.

Each of a pair of rails 24 is coupled to and extends from the housing 12. The rails 24 are spaced and parallel to each other. The rails 24 are substantially coplanar with the roller 22 wherein the rails 24 are configured for being positioned on a side 26 of the vehicle 16. Each rail 24 has a generally C-shaped cross-sectional shape perpendicular to a longitudinal axis of the rail 24. The open side 40 of each rail 24 faces the other rail 24. A cover 28 has a bottom end 30 coupled to the roller 22 such that rotation of the roller 22 extends and retracts the cover 28 relative to the housing 12. The cover 28 has opposite lateral sides 32. Each of the lateral sides 32 is positioned within an associated one of the rails 24. The cover 28 comprises a plurality of slats 42. Each of the slats 42 is coupled to a layer of fabric 44 wherein the layer of fabric 44 is configured for being positioned between the slats 42 and the side 26 of the vehicle 16. Thus, the layer of fabric 44 prevents scratching of the side 26 of the vehicle 16. Each slat 42 may be attached to the layer of fabric 44 by a fastener 66 such as a hook and loop fastener. The slats 42 are stiff and parallel to each other and the roller 22 wherein the cover 28 is pivotable along edges 48 of the slats 42 to facilitate wrapping the cover 28 around the roller 22. The slats 42 are constructed of aluminum or a like material.

A motor 50 is positioned in the housing 12 and coupled to the roller 22. The motor 50 rotates the roller 22. A remote control 52 is operationally coupled to the motor 50 wherein the roller 22 is rotatable by manipulation of the remote control 52. The remote control 52 may be a key fob or the like having a plurality of buttons programmed to extend and retract the cover 28 as desired. A stop 58 is positioned within one of the rails 24. The stop 58 is positioned proximate a distal end 60 of the one of the rails 24 relative to the housing 12 such that the stop 58 prevents over extension of the cover 28 from the housing 12.

In use, when the vehicle 16 is parked, the cover 28 is extended from the housing 12. While extended, the cover 28 provides a barrier to prevent damage to the side 26 of the vehicle 16. The cover 28 is retracted back into the housing 12 when access to a door of the vehicle 16 is desired. The cover 28 is stored in the housing 12 until needed again.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle side protection device for preventing damage to a side of a parked vehicle, said device comprising:
    a housing defining an interior space, said housing being configured for coupling to the vehicle;
    a slot extending through a top side of said housing, said slot being open into said interior space;
    a roller positioned in said housing;
    a pair of rails coupled to and extending from said housing, said rails being spaced and parallel to each other, said rails being coplanar with said roller wherein said rails are configured for being positioned on the side of the vehicle; and
    a cover having a bottom end coupled to said roller such that rotation of said roller extends and retracts said cover relative to said housing, said cover having opposite lateral sides, each of said lateral sides being positioned within an associated one of said rails, said cover comprising a plurality of slats, each of said slats being coupled to a layer of fabric wherein said layer of fabric is configured for being positioned between said slats and the side of the vehicle, said slats being stiff and parallel to each other and said roller wherein said cover is pivotable along edges of said slats to facilitate wrapping said cover around said roller.

2. The device of claim 1, further comprising a motor coupled to said roller, said motor rotating said roller.

3. The device of claim 2, further comprising a remote control, said remote control being operationally coupled to said motor wherein said roller is rotatable by manipulation of said remote control.

4. The device of claim 1, further comprising a stop, said stop being positioned within one of said rails, said stop being positioned proximate a distal end of said one of said rails relative to said housing.

5. The device of claim 1, further comprising said slats being constructed of aluminum.

6. A vehicle side protection device for preventing damage to a side of a parked vehicle, said device comprising:
    a housing defining an interior space, said housing being configured for coupling to the vehicle;
    a slot extending through a top side of said housing, said slot being open into said interior space;
    a roller positioned in said housing;
    a pair of rails coupled to and extending from said housing, said rails being spaced and parallel to each other, said rails being coplanar with said roller wherein said rails are configured for being positioned on the side of the vehicle;
    a cover having a bottom end coupled to said roller such that rotation of said roller extends and retracts said cover relative to said housing, said cover having opposite lateral sides, each of said lateral sides being positioned within an associated one of said rails, said cover comprising a plurality of slats, each of said slats being coupled to a layer of fabric wherein said layer of fabric is configured for being positioned between said slats and the side of the vehicle, said slats being stiff and parallel to each other and said roller wherein said cover is pivotable along edges of said slats to facilitate wrapping said cover around said roller, said slats being constructed of aluminum;
    a motor coupled to said roller, said motor rotating said roller;
    a remote control, said remote control being operationally coupled to said motor wherein said roller is rotatable by manipulation of said remote control; and
    a stop, said stop being positioned within one of said rails, said stop being positioned proximate a distal end of said one of said rails relative to said housing.

* * * * *